US006189745B1

(12) United States Patent
Frank

(10) Patent No.: US 6,189,745 B1
(45) Date of Patent: Feb. 20, 2001

(54) FLUID DISPENSING VALVE INCLUDING A FLUID DIFFUSER

(75) Inventor: Jimmy I. Frank, 17 Woodsborough, Houston, TX (US) 77055

(73) Assignee: Jimmy I. Frank, Houston, TX (US)

( * ) Notice: Under 35 U.S.C. 154(b), the term of this patent shall be extended for 0 days.

(21) Appl. No.: 09/320,064

(22) Filed: May 26, 1999

Related U.S. Application Data

(60) Provisional application No. 60/086,855, filed on May 27, 1998.

(51) Int. Cl.[7] .............................. B67D 3/00; F16K 47/00

(52) U.S. Cl. .......................... 222/509; 222/547; 222/564; 251/120; 251/127; 137/614.2

(58) Field of Search .................................... 222/509, 547, 222/564; 251/127, 120, 121, 122, 322; 137/614.2

(56) References Cited

U.S. PATENT DOCUMENTS 2,243,930 * 6/1941 Watson ................................ 251/322
2,461,909 * 2/1949 McClure ............................. 251/120
2,758,608 * 8/1956 Sutcliffe ............................... 251/322
4,715,414 * 12/1987 Harrison et al. .................. 222/400.7
5,564,602 * 10/1996 Cleland et al. ................... 222/146.6
5,727,773 * 3/1998 Dunnigan ............................. 251/325

* cited by examiner

*Primary Examiner*—Kevin Shaver
*Assistant Examiner*—Eric Keasel
(74) *Attorney, Agent, or Firm*—Howrey Simon Arnold & White, LLP

(57) ABSTRACT

A fluid dispensing device includes a valve body defining a longitudinal opening therein, an inlet in flow communication with the longitudinal opening that defines an axis generally transverse to the longitudinal opening, and an outlet defined by a first end of the longitudinal opening. A sealing member is situated within the longitudinal opening, and a valve stem is linearly movable within the longitudinal opening and adapted to seat against the sealing member to control fluid flow from the inlet to the outlet. A nozzle is coupled to the valve body adjacent the outlet and defines an opening therethrough such that fluid can flow from the outlet through the nozzle. An apparatus is situated within the nozzle so as to cause fluid flowing from the outlet through the nozzle to do work.

13 Claims, 5 Drawing Sheets

FIG. 1
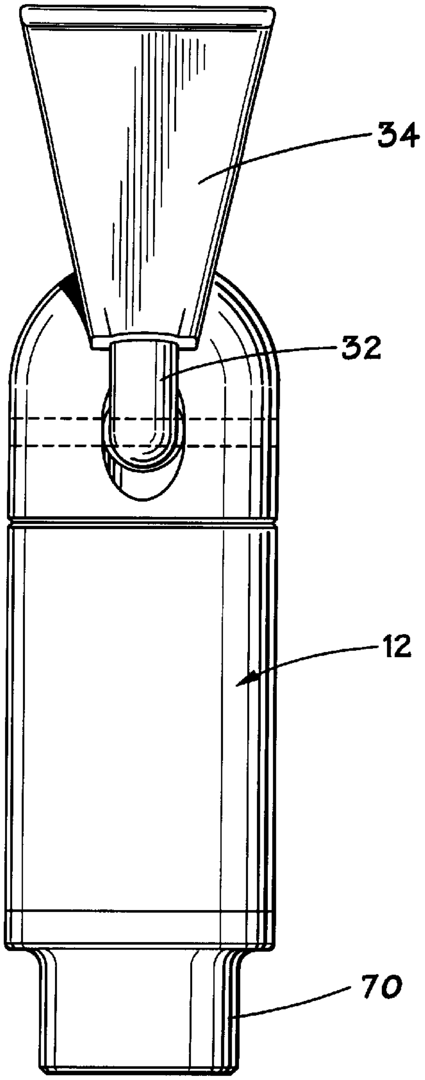
FIG. 4
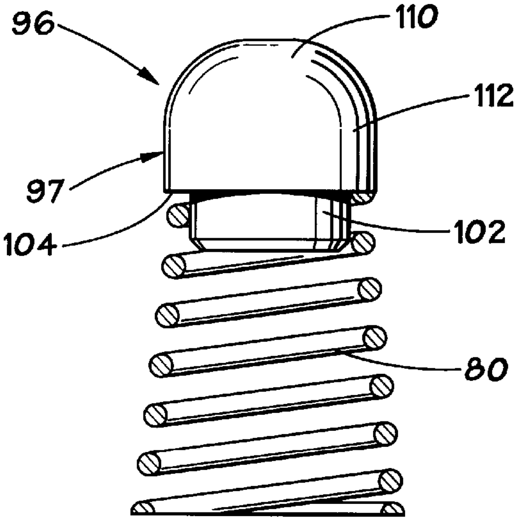
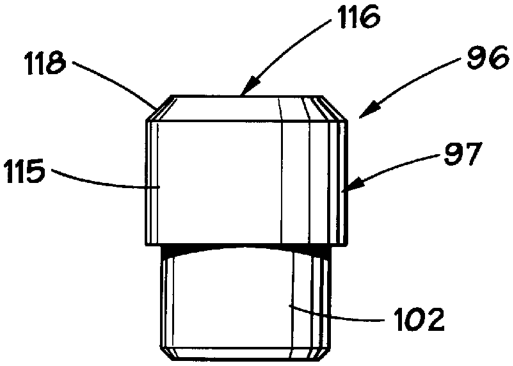
FIG. 5

FIG. 2
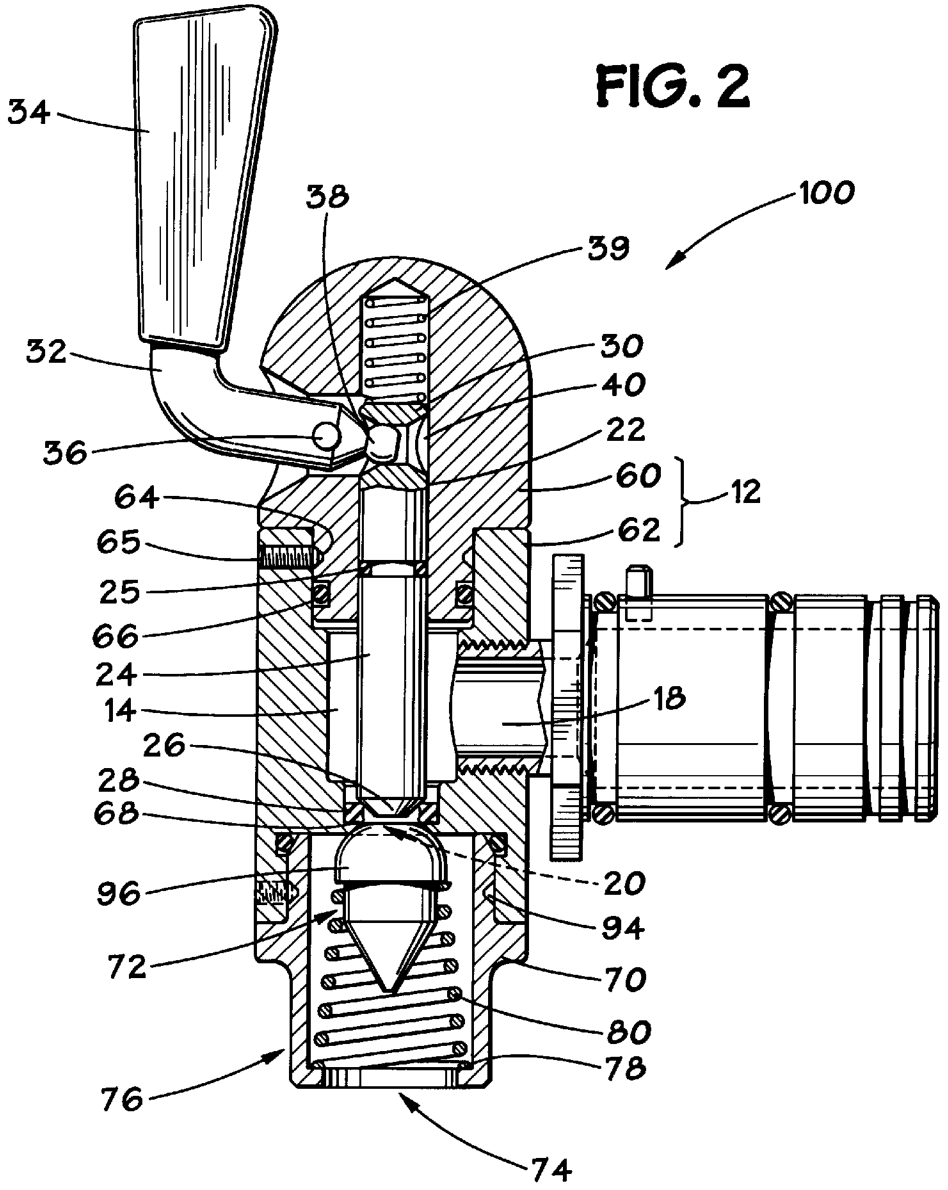
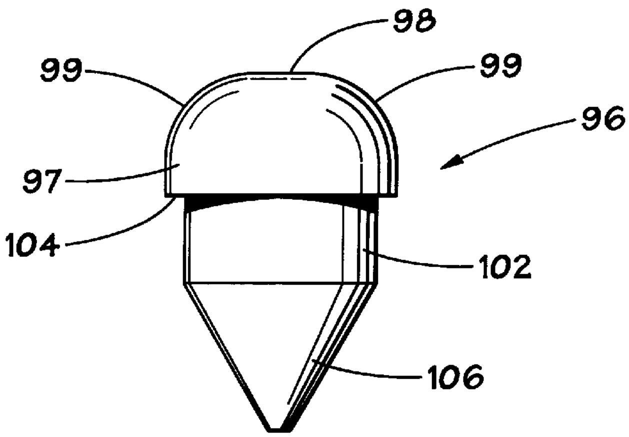
FIG. 3

FLUID DISPENSING VALVE INCLUDING A FLUID DIFFUSER

CROSS-REFERENCE TO RELATED APPLICATIONS

This application claims the benefit of U.S. Provisional Application Ser. No. 60/086,855 filed on May 27, 1998 by the same inventor, which is incorporated herein by reference in its entirety.

BACKGROUND OF THE INVENTION

1. Field of the Invention

The invention relates generally to devices for dispensing fluids, and more particularly, to an improved device for dispensing beverages.

2. Description of Related Art

Dispensing devices, particularly dispensing valves for controlling the flow of a fluid from a container, are well known in the art. An example of such a device is a valve for dispensing frozen or liquid, gas saturated or unsaturated beverages. Frozen carbonated beverage machines are known in the art and have been used for years. These devices produce a frozen carbonated beverage by freezing a mixture of ingredients including syrup, water and carbon dioxide in a mixing chamber. The mixture freezes on the inner surface of the mixing chamber that is surrounded by a helical coil through which a refrigerant passes. A rotating shaft disposed inside the chamber has a plurality of outwardly projecting blades that scrape the mixture off the inside wall of the mixing chamber. Once the carbonated beverage is in the desired frozen state, the product is dispensed from the chamber through a dispensing valve.

During the process of dispensing beverages through dispensing valves, a pressure reduction occurs. If the beverage contains dissolved gases at or near the saturation levels, when the pressure is reduced through a valve, a release of a portion of the dissolved gases will occur.

Known dispensing valves for dispensing gas saturated frozen and liquid beverages are typically designed to retain the highest possible level of dissolved gases. When the associated pressure reduction occurs, some of the energy from the reduction in pressure is converted to turbulent flow. This effect causes the release of some of the dissolved gases in the beverage. The design of the dispensing valve can cause more or less turbulence, thus releasing more or less of the dissolved gas.

Similar effects are observed when a bottled beverage is opened without first shaking the bottle, versus opening the bottle after shaking it. If the bottle is not shaken, a much smaller amount of dissolved gases will be released than if the bottle is first shaken. The turbulent shaking causes instability of the dissolved gases, which are released upon opening. In most cases, the beverage is also chilled to increase the solubility of the gases in the beverage.

As in the case of sealed bottles, a flowing dispensed beverage is cooled prior to dispensing and the beverage at the higher pressure is maintained at or near saturation. The desired effect in most cases is to serve a beverage at the lower atmospheric pressure, which retains gas content at or near saturation.

Foaming is also a problem that occurs when a gas saturated beverage is dispensed from a higher pressure to a lower pressure. Minimizing turbulence in flow or dispensing will reduce the effect of foaming. This problem is exhibited when beer is dispensed. Excess foaming will occur if the pressure reduction is too great or excess turbulence occurs during the dispense cycle. Diet beverages foam excessively if the pressure reduction is too great. While these two beverages are more sensitive to foaming due to their composition, all gas saturated beverages have this problem to a lesser degree.

Turbulence can occur in the supply line feeding the beverage dispensing valve. Lines that are sized too small or have fittings creating excessive pressure drop can create "turbulent flow" and produce an unstable beverage prior to dispensing from a valve. This is similar to shaking a bottle of beverage prior to opening. The obvious solution to the line turbulence is to size lines as short as possible and as large in diameter as possible and with few fittings. This will reduce turbulent line pressure drop that creates an unstable beverage.

Release of dissolved gases when dispensing a gas saturated frozen beverage can create additional problems. When the frozen beverage is dispensed, foaming occurs which creates a drink that has a volume greater than the volume of dispensed liquid. This desirable effect is called "overrun." However, if the resulting frozen beverage with overrun has been dispensed in a turbulent manner, the drink will dispense into a cup that will appear full. The frozen beverage will then release the unstable gas, causing the volume in the cup to become much smaller (collapse) and denser (less overrun). This is a very undesirable trait.

Thus, a need exists for a dispensing device that addresses the shortcomings of the prior art.

SUMMARY OF THE INVENTION

In one aspect of the present invention, a fluid dispensing device includes a valve body defining a longitudinal opening therein, an inlet in flow communication with the longitudinal opening that defines an axis generally transverse to the longitudinal opening, and an outlet defined by a first end of the longitudinal opening. A sealing member is situated within the longitudinal opening, and a valve stem is linearly movable within the longitudinal opening and adapted to seat against the sealing member to control fluid flow from the inlet to the outlet. A nozzle is coupled to the valve body adjacent the outlet and defines an opening therethrough such that fluid can flow from the outlet through the nozzle. An apparatus is situated within the nozzle so as to cause fluid flowing from the outlet through the nozzle to do work.

In one embodiment, the nozzle defines first and second ends, with the first end coupled to the valve body and the second end defining an annular ledge. The apparatus that causes the fluid to do work includes a conical spring with one end seated on the ledge, and a diffuser received by the opposite end of the spring, such that fluid flowing from the outlet does work as the fluid pushes the diffuser against the spring. Further, the fluid flows around the diffuser and through the spring as the fluid exits the nozzle second end. In some embodiments of the invention, the valve stem seats against one side of the seal member, and the apparatus is normally biased against the second side of the seal member, thus functioning as a check-valve.

BRIEF DESCRIPTION OF THE DRAWINGS

Other objects and advantages of the invention will become apparent upon reading the following detailed description and upon reference to the drawings in which:

FIG. 1 is a front view illustrating an exemplary fluid dispensing device in accordance with one embodiment of the present invention;

FIG. 2 is a side-sectional view of the fluid dispensing illustrated in FIG. 1;

FIG. 3 illustrates a diffuser in accordance with one embodiment of the present invention;

FIG. 4 illustrates a diffuser in accordance with another embodiment of the present invention;

FIG. 5 illustrates a diffuser in accordance with yet another embodiment of the present invention;

Figure 6:
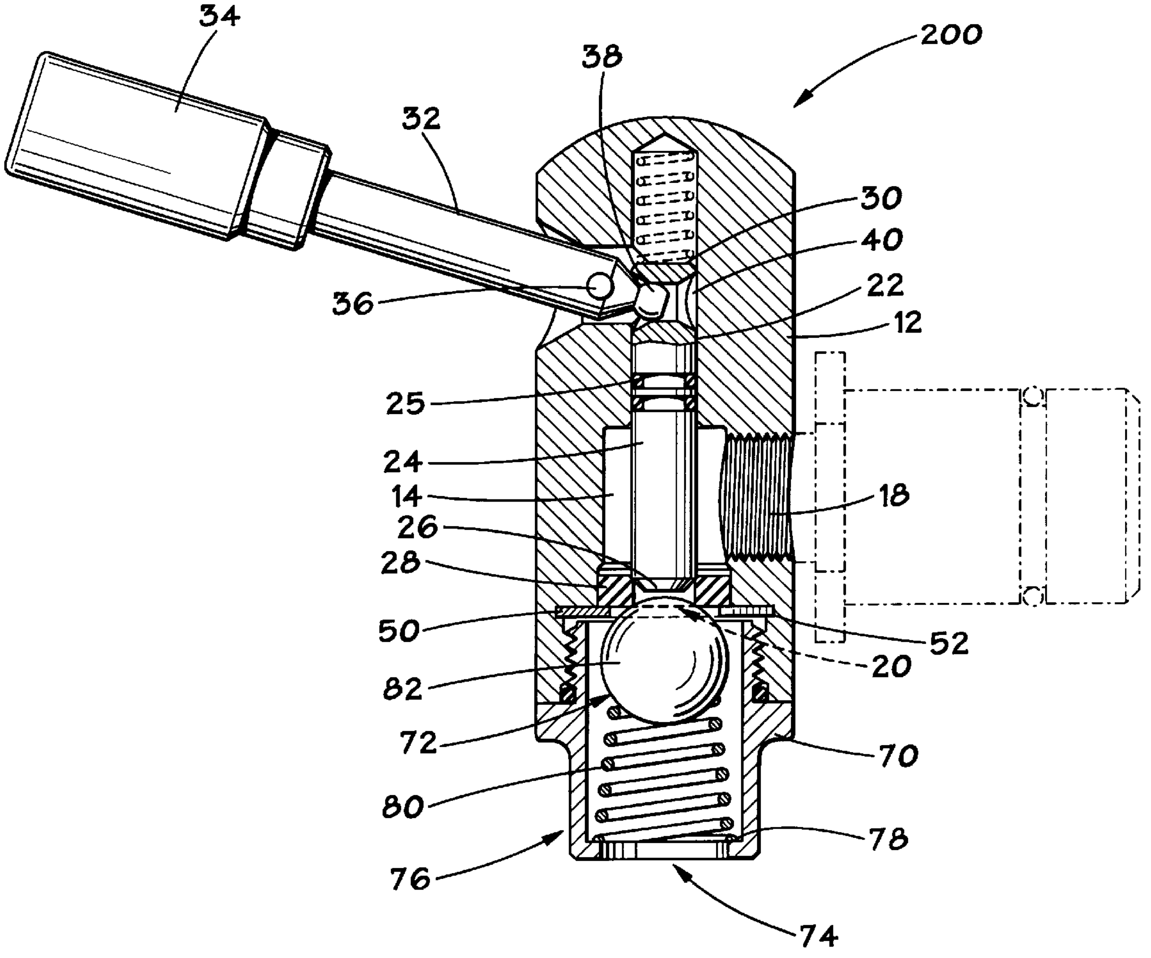
FIG. 6 is a sectional side view of an exemplary fluid dispensing device in accordance with another embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as disclosed herein.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The reduction of pressure in a turbulent manner creates instability of dissolved gases in a dispensed beverage. Thus, the present invention provides a device that reduces pressure with the energy released, while causing minimal turbulence. If the energy is forced to do "work" rather than causing a "free expansion," less energy will be available to cause turbulence. If a device is placed in the dispensing valve or in the line feeding the dispensing valve that will use the pressure reduction to create work, less energy will be available as turbulence.

Turning to the drawings, beverage dispensing devices in accordance with various embodiments of the present invention are illustrated. FIG. 1 and FIG. 2 illustrate an illustrative embodiment of a beverage dispensing device 100 in accordance with the present invention. The dispensing device 100 includes a valve body 12 defining a longitudinal opening 14 therein. In use, the axis of the longitudinal opening 14 is oriented vertically. The longitudinal opening 14 provides a flow passageway from an inlet 18, which is in flow communication with the longitudinal opening 14, to an outlet 20. As shown in FIG. 2, the inlet 18 defines an axis generally transverse to the longitudinal opening 14. The inlet 18 is adapted to be coupled to a container (not shown), such as a frozen carbonated beverage machine, that stores the material to be dispensed via the dispensing device 100. In the embodiments illustrated herein, the inlet is threaded so as to threadably couple the inlet 18 to the container. The outlet 20 is defined by a lower end of the longitudinal opening 14.

A valve stem 24 is situated within the longitudinal opening 14, such that the valve stem 24 is linearly moveable, bi-directionally, in the body 12. In the illustrated embodiment, an upper portion of the valve stem 24 is slidably received within a bore 22. The valve stem 24 has one or more O-rings 25 situated thereabout to seal the valve stem 24 relative to the bore 22. The valve stem 24 includes a first end 26 that is adapted to seal against a seal member 28 disposed within the outlet 20, thereby controlling fluid from flowing from the inlet 18 to the outlet 20. In the exemplary embodiment illustrated in FIG. 2, the outlet 20 defines a ledge 68 upon which the seal member 28 is disposed.

The valve stem 24 further defines a second end 30 having an actuator 32 coupled thereto. In the particular embodiments illustrated, the actuator 32 comprises a lever 34 pivotally coupled to the valve body 12 via a pin 36. The lever 34 defines an end protrusion 38 that is received by an opening 40 in the second end 30 of the valve stem 24. Thus, pivotal movement of the actuator 32 positions the first end 26 of the valve stem 24 relative to the seal member 28 to either allow or prevent fluid from flowing through the longitudinal opening 14. A biasing member, such as a spring 39, may be disposed within the opening 22 above the second end 30 of the valve stem 24 to bias the valve stem 24 in a closed position.

In the embodiment illustrated in FIG. 2, the valve body 12 includes a valve body portion 60 and a valve bonnet portion 62, which may be coupled together by any suitable means. In the particular embodiment illustrated in FIG. 2, the valve body portion 60 defines a circumferential groove 64, and a locking screw (not shown in FIG. 2) extends through the valve bonnet 62 and seats within the groove 64 to couple the valve body portion 60 and the valve bonnet 62 together. An O-ring seal 66 seats within an annular groove to prevent fluid from leaking out of the valve body 12.

A nozzle 70 is coupled to the valve body 12 adjacent the outlet 20. The nozzle 70 includes an opening 74 in an end 76 opposite the portion that is coupled to the valve body 12 for allowing fluid to exit the device 100 through the nozzle 70 when the valve stem 24 is moved to an open position. The nozzle 70 further defines an annular ledge 78 proximate the opening 74. The nozzle 70 may be coupled to the body 12 in any suitable manner. In the embodiment of FIG. 2, the nozzle 70 defines a circumferential groove 94. A locking screw (not shown in FIG. 2) extends through a corresponding opening through the body 12 to couple the nozzle 70 to the body 12. The valve body 12, valve stem 24 and nozzle 70 may be suitably fabricated, for example, from 303 or 304 stainless steel.

In accordance with aspects of the present invention, a work-producing apparatus 72 is situated within the nozzle 70 that uses the pressure reduction caused by moving the valve stem 24 relative to the seal member 28, thereby opening the dispensing device 100, to create work. Thus, less energy will be available as turbulence when the device 100 is opened. In alternative embodiments, the work-producing device 72 may be situated on the inlet-side of the seal member 28, for example, in the line coupled to the inlet 18. The device 72 may be any number of appropriate devices that removes energy while causing the fluid flowing through the dispensing device 100 to do work.

In the particular embodiment illustrated in FIG. 2 the apparatus 72 comprises a check valve disposed within the dispense nozzle 70. In the embodiment of the fluid dispensing device 100 illustrated in FIG. 2, the apparatus 72 includes a generally conical spring 80, with one end of the spring 80 situated on the ledge 78. A diffuser 96 is disposed on the opposite end of the spring 80, such that fluid flowing from the outlet 20 does work as the fluid pushes the diffuser 96 against the spring 80, and further, the fluid flows around the diffuser 96 and through the spring 80 as the fluid exits the nozzle 70. In some embodiments, the valve stem seats against one side of the seal member 28, and the spring 80 biases the diffuser 96 against the other side of the seal member 28. Thus, two separate seals are formed relative to the seal member 28.

The diffuser 96 of the embodiment illustrated in FIG. 2 is shown in FIG. 3. The diffuser 96 includes a generally cylindrical portion 97 having a top end including a flat portion 98 defining a plane oriented generally transverse to the axis of the longitudinal opening 14, and a radiused portion 99. The flat portion 97 provides a surface against which the fluid flowing from the outlet 20 may push, causing the diffuser to move against the spring 80, thereby creating work. The radiused portion 99 allows fluid to flow around the diffuser 96 to further break-up the fluid flow, and further, causes the fluid to flow evenly around the diffuser 96 to stabilize the apparatus 72 within the nozzle 70. A second generally cylindrical portion 102 defining a diameter smaller than the first portion 97 diameter extending coaxially from the first portion 97 so as to form a circumferential ledge 104 with the first portion 97. The second portion 102 is received within the spring 80 (see FIG. 2) such that the ledge 104 seats against the spring 80. The diffuser illustrated in FIG. 3 further includes a generally conical portion 106 extending from the second portion 102, which helps facilitate the insertion of the diffuser 96 within the spring 80.

Alternative embodiments of the diffuser are illustrated in FIGS. 4 and 5. In FIG. 4, the upper portion 97 includes a generally semi-spherical portion 110 and a generally cylindrical portion 112. and a stem portion 99 extending from the cylindrical portion 98 that is received within the upper portion of the spring 80. As in the embodiment of FIG. 3, the diffuser 97 of FIG. 4 includes a second generally cylindrical portion 102 defining a diameter smaller than the first portion 112 diameter extending coaxially from the first portion 97 so as to form a circumferential ledge 104 with the first portion 97. The second portion 102 is received within the spring 80 such that the ledge 104 seats against the spring 80.

The embodiment of the diffuser 96 illustrated in FIG. 5 includes an upper portion 97 with cylindrical portion 115 and a flat top portion 116. The diffuser 96 of FIG. 5 has a tapered section 118 that transitions the flat top portion 116 to the cylindrical portion 115, rather than the radiused portion 99 of the embodiment illustrated in FIG. 3. A suitable material for the various embodiments of the diffuser 96 disclosed herein includes plastic, such as DELRIN.

FIG. 6 illustrates another embodiment of a fluid dispensing device 200, showing further aspects of the present invention. For instance, the fluid dispensing device 200 shown in FIG. 6 employs a one-piece valve body 12. In the embodiment illustrated in FIG. 6, the seal member 28 is held in place by a snap ring 50. The snap ring 50 is seated within an annular groove 52 defined by the valve body 12 below the outlet 20. Further, the nozzle 70 is threadably connected to the body 12 in the device 200. It is understood that the specific components shown in the various embodiments disclosed herein are not limited to the particular arrangements illustrated. For example, it would be a routine undertaking to configure the device 100 of FIG. 2 with a one-piece valve body 12 as shown in FIG. 6 for one skilled in the art having the benefit of this disclosure.

In the particular embodiment illustrated in FIG. 6, the work producing apparatus 72 includes a ball 82 seated on the spring 80. As in the device 100 shown in FIG. 2, the first end 26 of the valve stem 24 shown in the device 200 seats against the upper portion of the seal member 28 and forms a seal therewith. The ball 82 seats against the lower portion of the seal member 28, forming the second seal therewith.

In embodiments of the invention wherein the work producing apparatus 72 forms a second seal with the seal member 28, the apparatus 72 functions as a check valve. This provides the benefit of preventing fluid from being dispensed if the pressure of the fluid in the container is too low. In a frozen beverage dispensing device, for example, the diffuser 96 or ball 80 biased against the seal member 28 by the spring 80 prevents the beverage from being dispensed if the pressure within the container is too low. This, in turn, prevents a user from emptying the chamber by dispensing the beverage in a liquid form, rather than a frozen form.

When the valve stem 24 is moved to an open position such that the first end 26 is not seated against the seal member 28, if the pressure upstream of the dispensing device 100, 200 is high enough to overcome the energy of the spring 80 holding the ball 82 or diffuser 96 against the seal member 28, the check valve 72 will also open and allow the beverage at the higher pressure to flow from the inlet 18, through the longitudinal opening 14 to the outlet 20, and out through the nozzle 70. In the particular embodiments illustrated in FIGS. 2 and 6, the spring 80 is seated on the ledge 78 within the nozzle 70. Hence, the fluid flows against and around the ball 82 or diffuser 96, and through the spring 80. Further, the generally conical shape of the spring 80 assists in holding the ball 82 or diffuser 96 in place as the fluid flows against the ball 82 or diffuser 96 and through the spring 80. The fluid is forced to "work" when moving the ball 82 or diffuser 96 against the spring 80, so less of the energy will be converted to turbulence. Thus, the beverage will retain more of the dissolved gases, resulting in a more stable beverage.

Figure 7:
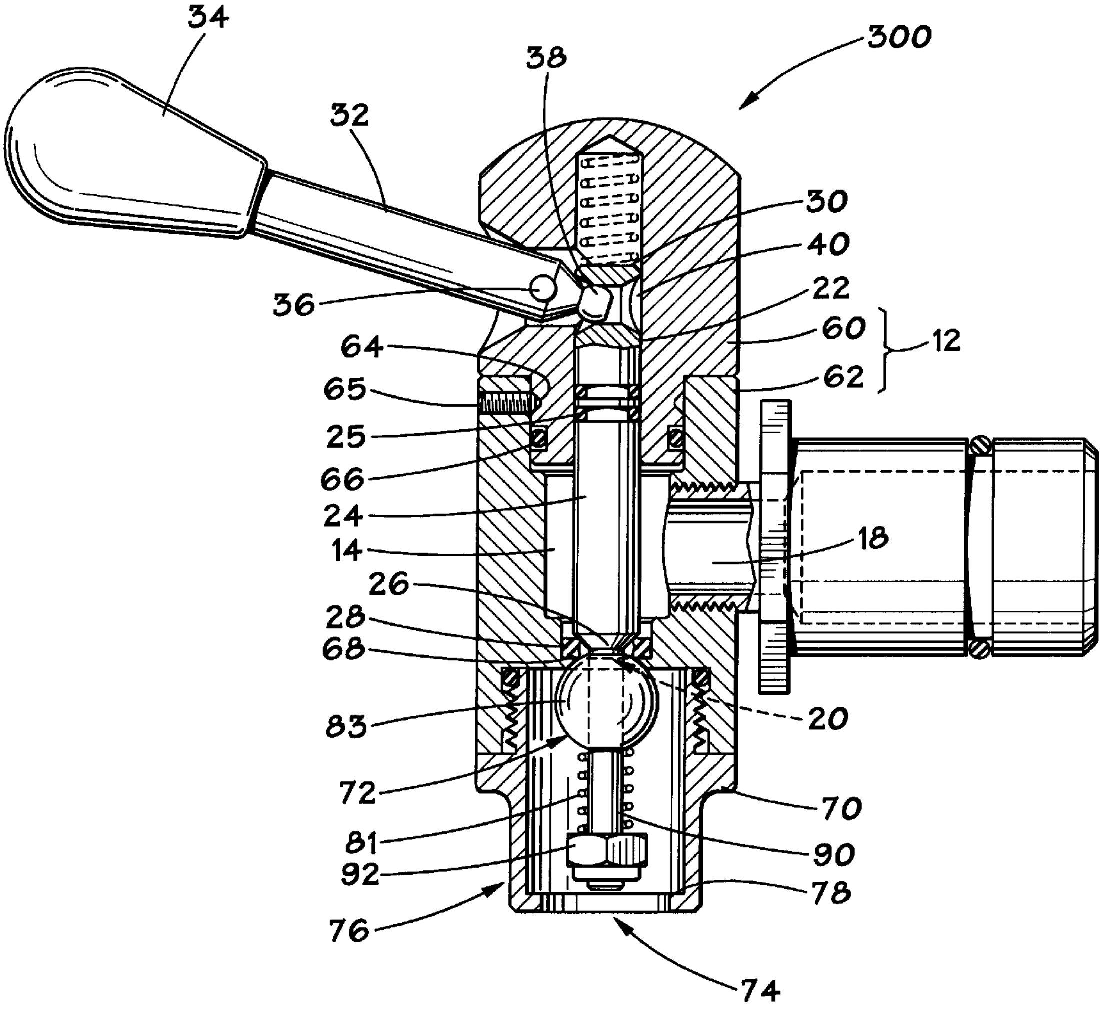
FIG. 7 is a sectional side view of an exemplary fluid dispensing device in accordance with a further embodiment of the present invention.

Turning now to FIG. 7, a fluid dispensing device 300 in accordance with yet another embodiment of the present invention is illustrated. A shaft 90 extends from the first end 26 of the valve stem 24. A ball 83, or other suitable member, such as the various diffusers 96 disclosed herein, defines an opening therethrough that is adapted to fit about the shaft 90, such that the ball 83 may slide up and down the shaft 90. A spring 81 is disposed about the shaft 90 below the ball 83, and a stop member, such as a nut 92 is threaded about the shaft 90 to set the spring 81 in a predefined position. The spring 81 pushes against the nut 92 so as to bias the ball 83 up against the lower portion of the seal member 28, forming a seal therewith. Other suitable devices may be used in place of the nut 92 to set the spring 81 in its predefined position.

When the valve stem 24 of the dispensing device 300 is moved to open the device 300, the shaft 90 and, in turn, the nut 92 with the spring 81 seated thereon, move with the valve stem 24. This compresses the spring 81 and tightens the seal of the ball 83 against the lower portion of the seal member 28. However, the movement of the valve stem 24 also breaks the seal of its first end 26 with the upper portion of the seal member 28. As with the dispensing devices 100, 200, if the pressure upstream of the dispensing device 300 is high enough to overcome the energy of the compressed spring 81 holding the ball 83 against the seal member 28, the check valve 72 will also open and allow the beverage at the higher pressure to flow from the inlet 18, through the longitudinal opening 14 to the outlet 20, and through the nozzle 70. The ball 83 and spring 81 cause the fluid flowing through the dispensing device 300 to do work when compressing the ball 83 against the spring 81, reducing the energy available as turbulence when the device 300 is opened.

It is not necessary, however, for the work producing apparatus 72 to completely seal against the seal member 28 for the various fluid dispensing devices 100, 200, 300 to operate. The valve stem 24 seats against the seal member 28 to close the device. When the valve stem 24 is moved to allow fluid to flow through the device, the fluid moves the ball 82, 83 or diffuser 96 against the spring 80, 81, causing the fluid to do work and diffusing the fluid flow.

Figure 8:
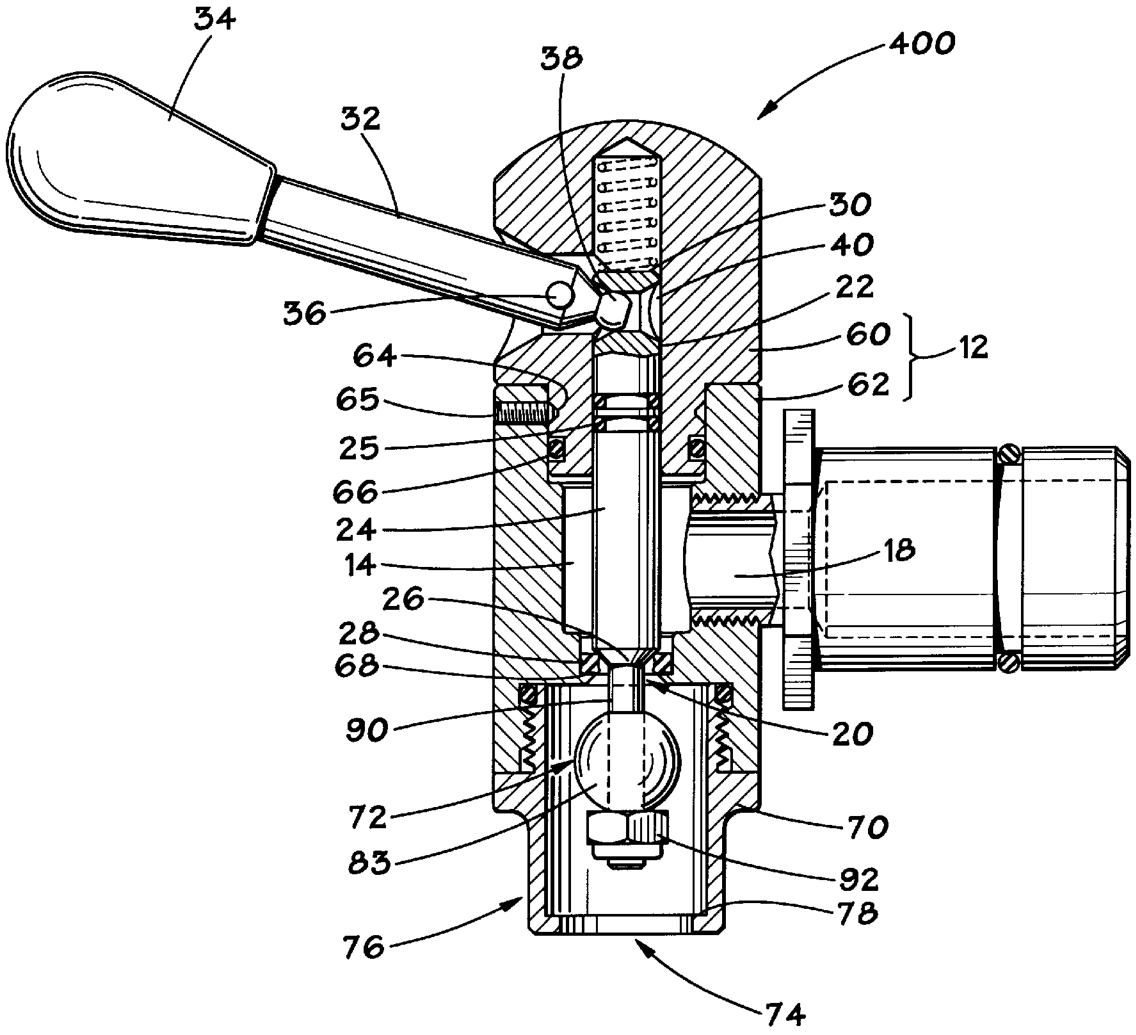
FIG. 8 is a sectional side view of an exemplary fluid dispensing device in accordance with a still further embodiment of the present invention.

The fluid dispensing device 400 illustrated in FIG. 8 includes the shaft 90 extending from the first end 26 of the valve stem 24 in a manner similar to the dispensing device 300 of the embodiment illustrated in FIG. 7. A ball 83 defines an opening therethrough, adapted to receive the shaft 90, such that the ball 83 slides about the shaft 90. As with the embodiment illustrated in FIG. 7, another member may be substituted for the ball 83. For instance, it would be a routine undertaking for one skilled in the art, having the benefit of this disclosure, to reconfigure the various diffusers 96 to replace the ball 83 of the embodiments illustrated in FIG. 7 or FIG. 8. When a user operates the handle 34 so as to move the first end 26 of the valve stem 24 away from the sealing member 28, fluid flows from the inlet 18, through the passage 14, and out through the outlet 20. The fluid pushes on the ball 83, and against the force of the user holding the valve stem 24 in an open position via the handle 34. The fluid flows around the ball 83, which distributes the fluid throughout the nozzle 70.

The exemplary embodiments disclosed herein provide a fluid dispensing device that reduces the pressure of a gas saturated frozen beverage from a higher pressure to a lower pressure (atmospheric). Among other things, the dispensing device reduces turbulence and the associated release of dissolved gases. A benefit of the fluid dispensing device is to provide a more stable dispensed drink with stable overrun (does not collapse) and more stable gas content.

Another benefit of the various embodiments of the present invention disclosed herein is to reduce "freeze-ups" or stoppage of flow. When a frozen beverage is dispensed it can over-freeze the frozen solution, causing an ice plug and, in turn, the stoppage of flow. This can also occur due to non-use of the dispensing device while the frozen beverage is waiting to be dispensed. The frozen beverage can be trapped in a valve cavity where it can melt and refreeze into an ice plug just prior to dispensing. Providing a check valve, such as the device 72, reduces the amount of beverage that is trapped within the dispensing device, thereby reducing freeze-ups.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified and all such variations are considered within the scope and spirit of the invention.

What is claimed is:

1. A fluid dispensing device, comprising:

a valve body defining a longitudinal opening therein;

an inlet in flow communication with the longitudinal opening, the inlet defining an axis generally transverse to the longitudinal opening;

an outlet defined by a first end of the longitudinal opening;

a sealing member having first and second sides situated within the longitudinal opening;

a valve stem linearly movable within the longitudinal opening and adapted to seat against the first side of the sealing member to control fluid flow from the inlet to the outlet;

a nozzle having a first end coupled to the valve body adjacent the outlet and a second end defining an annular ledge, the nozzle defining an opening therethrough such that fluid can flow from the outlet through the nozzle;

a conical spring having first and second ends, the first end seated on the ledge; and a diffuser including:

a first generally cylindrical portion having a sidewall defining a diameter and a top end including a circular flat portion defining a plane oriented generally transverse to the axis of the longitudinal opening and defining a diameter smaller than the diameter of the sidewall, and a second generally cylindrical portion defining a diameter smaller than the sidewall diameter, the second portion extending coaxially from the first portion so as to form a circumferential ledge with the first portion, the second portion being received within the second end of the spring wherein the spring normally biases the diffuser against the second side of the seal member;

such that fluid flowing from the outlet pushes the diffuser against the spring, and the fluid flows around the diffuser and through the sprint as the fluid exits the nozzle second end.

2. The fluid dispensing device of claim 1, wherein the diffuser further comprises a radiused portion transitioning the circular flat portion to the sidewall.

3. The fluid dispensing device of claim 1, wherein the diffuser further comprises a generally conical portion extending from the second portion.

4. The fluid dispensing device of claim 1, wherein the seal member comprises an o-ring.

5. The fluid dispensing device of claim 1, wherein the first end of the longitudinal opening and the first end of the nozzle are threaded such that the nozzle is threadably connected to the valve body.

6. The fluid dispensing device of claim 1, wherein the first end of the nozzle defines a circumferential groove, wherein the valve body defines a threaded bore therethrough transverse to the axis of the longitudinal opening, and wherein a set screw extends through the threaded bore and seats in the circumferential groove to couple the nozzle first end to the valve body.

7. The fluid dispensing device of claim 1, wherein the diffuser comprises a tapered portion transitioning the circular flat portion to the sidewall.

8. The fluid dispensing device of claim 1, wherein the valve stem is movable from a first position in which a first end of the valve stem seats against the seal member preventing fluid flow through the outlet, to a second position in which the first end of the valve stem is unseated from the seal member to allow fluid flow through the outlet.

9. The fluid dispensing device of claim 8, wherein the valve stem includes a second end, the fluid dispensing device further comprising a handle pivotally coupled to the second end of the valve stem, such that the handle is operable to move the valve stem between the first and second positions.

10. The fluid dispensing device of claim 8, further comprising a biasing member situated to normally bias the valve stem in the first position.

11. A fluid dispensing device, comprising:

a valve body defining a longitudinal opening therein;

an inlet in flow communication with the longitudinal opening, the inlet defining an axis generally transverse to the longitudinal opening;

an outlet defined by a first end of the longitudinal opening a sealing member situated within the longitudinal opening a valve stem linearly movable within the longitudinal opening and adapted to scat against the sealing member to control fluid flow from the inlet to the outlet;

a nozzle coupled to the valve body adjacent the outlet, the nozzle defining an opening therethrough such that fluid can flow from the outlet through the nozzle;

a shaft extending from the valve stem through the outlet and into the nozzle;

a stop member coupled to an end of the shaft opposite the valve stem; and a diffuser defining a hole therethrough, the shaft extending through the hole such that the diffuser is slidable about the shaft, the stop member preventing the diffuser from sliding off of the shaft;

wherein fluid flowing from the outlet does work as the fluid pushes the against the diffuser, and the fluid flows around the diffuser as the fluid exits the nozzle second end.

12. The fluid dispensing device of claim 11, further comprising a spring situated about the shaft between the stop member and the diffuser.

13. The fluid dispensing device of claim 11, wherein the diffuser comprises a ball.

* * * * *

UNITED STATES PATENT AND TRADEMARK OFFICE

CERTIFICATE OF CORRECTION

PATENT NO. : 6,189,745 B1
DATED : February 20, 2001
INVENTOR(S) : Jimmy I. Frank It is certified that error appears in the above-identified patent and that said Letters Patent is hereby corrected as shown below:

<u>Column 8,</u>
Line 32, delete "sprint" and insert -- spring --.

Signed and Sealed this

Thirteenth Day of November, 2001

*Attest:*

Nicholas P. Godici

NICHOLAS P. GODICI

*Attesting Officer* *Acting Director of the United States Patent and Trademark Office*